United States Patent [19]

Van Rooy et al.

[11] Patent Number: 4,847,524
[45] Date of Patent: Jul. 11, 1989

[54] GAMMA CORRECTION CIRCUIT

[75] Inventors: Johannes H. J. M. Van Rooy, Breda; Johannes M. Menting, Eindhoven, both of Netherlands

[73] Assignee: U.S. Philips Corporation, New York, N.Y.

[21] Appl. No.: 21,840

[22] Filed: Mar. 4, 1987

[30] Foreign Application Priority Data

Mar. 7, 1986 [NL] Netherlands ............... 8600593

[51] Int. Cl.[4] ............... H03K 5/22; H04N 9/64
[52] U.S. Cl. .................... 307/494; 307/491; 358/32; 358/164; 330/257
[58] Field of Search ............... 307/490, 494; 328/142, 328/143; 330/257; 358/164, 32

[56] References Cited

U.S. PATENT DOCUMENTS

| | | | |
|---|---|---|---|
| 3,708,693 | 1/1973 | Ferrier | 328/142 |
| 4,480,268 | 10/1984 | Osawa et al. | 328/142 |
| 4,529,893 | 7/1985 | Nagano | 307/494 |
| 4,558,363 | 12/1985 | Sugimoto | 358/164 |
| 4,589,021 | 5/1986 | Sato et al. | 358/164 |
| 4,651,210 | 3/1987 | Olson | 328/142 |

FOREIGN PATENT DOCUMENTS 0116398 8/1984 European Pat. Off. .
0157381 8/1985 Japan ................... 358/32

Primary Examiner—Stanley D. Miller
Assistant Examiner—Richard Roseen
Attorney, Agent, or Firm—Edward W. Goodman

[57] ABSTRACT

A gamma correction circuit is formed with several differential amplifiers (6-10) and (11-15) each being capable of being driven into saturation with a different saturation current supplied by a current source at a different signal value (Vx and Vw, respectively) in an input signal (PV). The non-linearly changing output currents of the differential amplifiers are added with the aid of a current-mirror circuit (16-21) which is also active as a supply circuit for the differential amplifiers. The gamma-corrected output signal (PV') is obtained across a resistor (22) connected to a connection (17) of the current-mirror circuit. In the case of a changing temperature, a temperature compensation is required. To this end, the negative temperature coefficient at the base-emitter threshold voltage (Vbe) of current source transistors (8, 13) of the differential amplifiers is utilized via an adjustable voltage source (23-27), which leads to a positive relative temperature coefficient for the current of the current sources (8, 9), (13, 14) compensating the negative relative temperature cofficient at the transfer characteristic at the differential amplifiers.

5 Claims, 1 Drawing Sheet

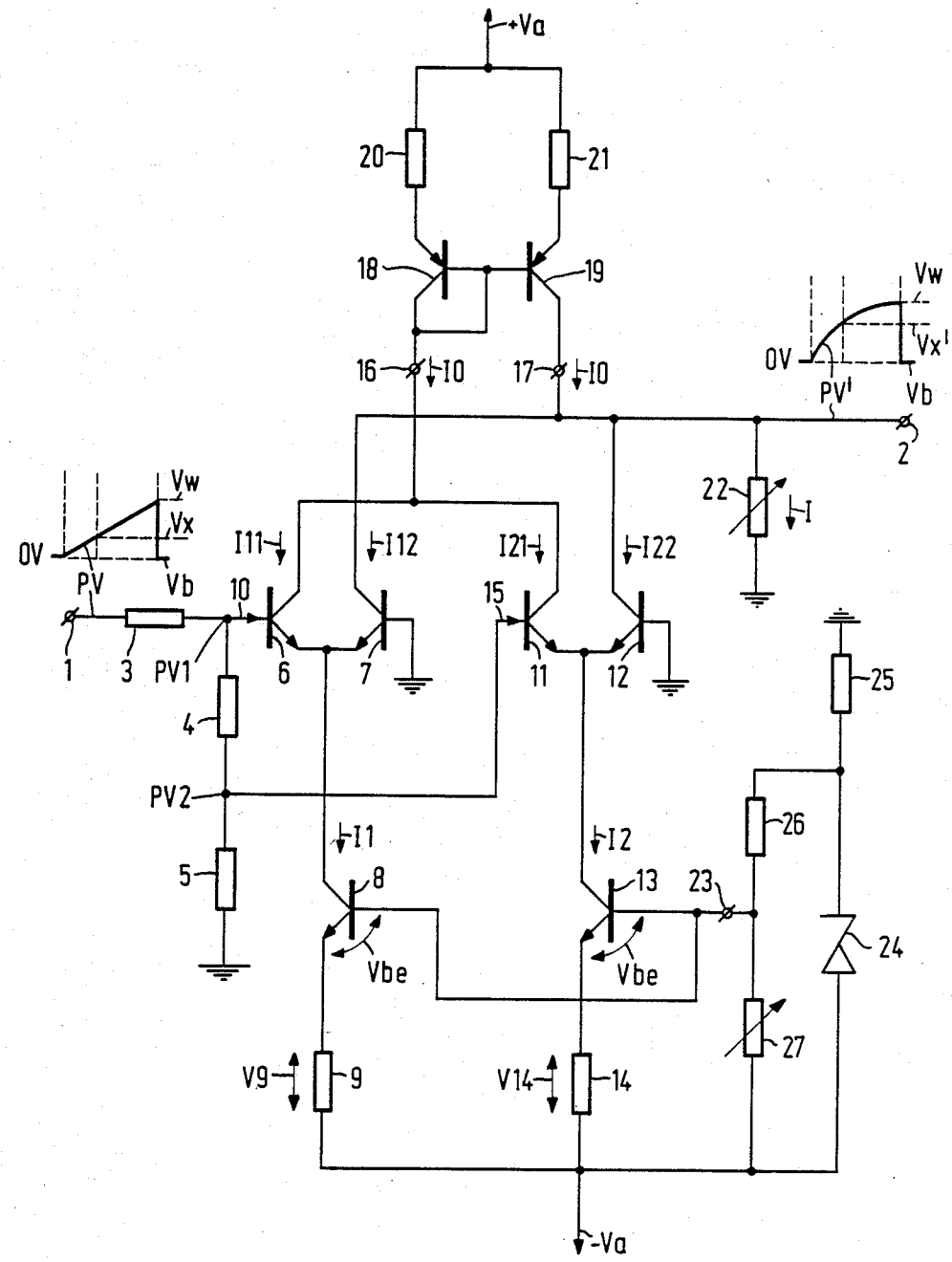

GAMMA CORRECTION CIRCUIT

BACKGROUND OF THE INVENTION

The invention relates to a gamma correction circuit comprising a non-linear differential amplifier having an input coupled to a circuit input for the supply of a signal to be gamma-corrected and comprising two emitter-coupled transistors and a current source present in the transistor-emitter lead, and a current-mirror circuit coupled to a differential amplifier output and an output of the gamma correction circuit for the supply of a gamma-corrected signal.

a circuit of this type is described in European Patent Application No. 0,116,398. The non-linear differential amplifier is, to this end, formed with several numbers of series-connected diodes. With the aid of the current mirror circuit, the currents are maintained equal to each other so that the gamma-corrected signal has a gamma characteristic at the circuit output which is independent of temperature variations in the circuit components. The patent application describes three embodiments with many circuit components in a complicated circuit structure in each of them and particularly with a striking number of diodes.

SUMMARY OF THE INVENTION

It is an object of the invention to realize a gamma correction circuit having a simple circuit structure and in which no diodes are used to obtain the non-linear transfer characteristic. To this end, a gamma correction circuit according to the invention is characterized in that the circuit input is coupled to inputs of at least two differential amplifiers, these differential amplifiers each being driven into saturation at a different input signal value; the current sources of the different differential amplifiers each have a different substantially constant current, and the current-mirror circuit being present as a common supply circuit for the differential amplifiers and having, for that purpose, a first and second connection which is connected to the collectors of a first and a second transistor, respectively, of the two emitter-coupled transistors.

The non-linear transfer characteristic of the differential amplifiers is utilized. The use of the current-mirror circuit in combination with the several differential amplifiers as a common supply circuit for these differential amplifiers leads to a simple and stable current addition and to the possibility of a singleended coupling out of the signal from one of the connections.

It is to be noted that it is known per se from U.S. Pat. No. 3,708,693 to perform a gamma correction by means of the non-linear transfer characteristics of several differential amplifiers. The U.S. Pat. No. 3,708,693 describes that the emitters of the transistors in each differential amplifier are interconnected and are connected to a supply terminal via resistors having pre-determined values. Each differential amplifier has therefore a different characteristic and the output currents are added together for obtaining the pre-determined nonlinear amplification.

The following drawbacks of the circuit according to the said U.S. Pat. No. 3,708,693 are stated with respect to the present patent application.

At least from differential amplifiers of the structure described are required to realize a somewhat smoothly varying gamma characteristic. This is due to the step-wise linear approximation with sharp kinks between substantially straight lines therebetween, as is also shown in FIG. 4 of the said U.S. Pat. No. 3,708,693. In contrast thereto, in the circuit according to the present patent application it is sufficient to have two differential amplifiers with current sources in the emitter leads of the emitter-coupled transistor pairs, because use is made of the more gradually varying transfer characteristic at the transistor pairs.

Since the output transistors in the differential amplifiers are driven into conductance from the turned-off state, there is a transfer characteristic with a long start and a poor high-frequency character.

Furthermore, the asymmetric structure of the differential amplifiers and the fact that the current sources are not used result in a transfer characteristic having a stronger interference.

To utilize the possibility of the single-ended coupling out of the signal, an embodiment of a gamma correction circuit according to the invention is characterized in that the connection of the currentmirror circuit to the collectors of the differential amplifier transistors, whose base electrodes are connected to a bias voltage without the supply of a signal, is connected to the output of the gamma correction circuit and to a a resistor which is connected to the bias voltage.

The amplitude of the output signal can be arbitrarily adjusted in an embodiment which is characterized in that the said resistor is adjustable.

An embodiment of the gamma correction circuit according to the invention in which temperature changes do not unacceptably influence the gamma characteristic is characteized in that for compensating a negative relative temperature coefficient in the transfer characteristic of the differential amplifier, with the coefficient value being dependent on the input signal values at the differential amplifier, a current source transistor, which is provided with a base, an emitter and a collector and an emitter-resistor, has its base connected to the output of the voltage source without having a diode-resistor connection with a supply terminal, the voltage across said voltage source, which is equal to the sum of the base-emitter threshold voltage having a negative temperature coefficient and of the voltage drop across the emitter resistor, leading to a positive relative temperature coefficient in the current of the current source, the absolute coefficient value being equal to that of the negative temperature coefficient in the transfer characteristic for a given input signal value.

In practice the compenstion in the varying temperatures for the gamma characteristic is found to occur optimally in an embodiment which is characterized in that the given input signal value is the maximum value of the input signal.

In this case the gamma characteristic in the associated maximum output signal value is made temperature-independent as much as possible, while furthermore the minimum output signal value may be present at an input current which is equal to zero, which implies a temperature-independence for this signal value. Intermediate signal values are then optimally compensated for temperature changes.

An embodiment of the gamma correction circuit having an easily adjustable voltage source is characterized in that the voltage source comprises a series arrangement of a Zener diode and a resistor present between two voltage terminals, a resistor-voltage divider including an adjustable resistor being arranged parallel to the Zener diode, the output of the voltage source being connected to a junction point in the voltage divider.

DESCRIPTION OF THE DRAWING

The invention will be described in greater detail by way of example with reference to the accompanying drawing having the sole FIGURE showing a circuit diagram of a gamma correction circuit according to the invention.

DESCRIPTION OF THE PREFERRED EMBODIMENT

In the circuit diagram of the FIGURE, the reference numeral 1 of a gamma correction circuit according to the invention denotes a circuit input for the supply of a signal PV to be gammacorrected shown next to this input, by way of example, as a function of time. The signal PV is, for example, a television picture signal which may vary between a black level Vb (=0 V) and a white level Vw as a minimum and a maximum input signal value, respectively. The white level Vw is, for example, between 0.5 and 1 V. The reference Vx denotes a gray value. In FIG. 1, the input signal PV is shown, by way of example, with a linearly increasing variation between the black level Vb and the white level Vw. As a television picture signal, the signal PV is associated with a television line raster formed periodically with line and field periods. The part of the signal PV shown then occurs in a line period which has not been indicated. Under the supply of the input signal PV shown, the gamma correction circuit supplies a gamma-corrected output signal PV from its output 2, this signal PV' being shown next to this output as a function of time. The output signal PV' has a variation between the black level Vb (=0 V) and the white level Vw with the desired gamma, while the gray value Vx' is associated with the input grey value Vx.

The circuit input is connected to ground via a voltage divider consisting of three resistors 3, 4 and 5. The connection between the resistors 3 and 4 conveying a fraction of the input signal PV denoted by PV1 is connected to the base of an npn-transistor 6. The emitter of the transistor 6 is connected to the emitter of an npn-transistor 7 whose base is connected to a bias voltage which is shown in the FIGURE as ground by way of example. The emitter lead of the two emitter-coupled transistors 6 and 7 comprises a series arrangement of an npn-transistor 8 and a resistor 9 connected to a voltage terminal carrying a supply voltage −Va. The voltage −Va originates from a supply voltage source (not shown) applying to other terminals a supply voltage +Va and the ground potential of 0 V. For the purpose of comparison with the value of 0.5 to 1 V for the voltage Vw, 5 V is mentioned for the voltage Va. The collector of the transistor 8 is connected to the emitters of the transistors 6 and 7 and the transistor 8 is active as a current source transistor with the resistor 9 as an emitter-resistor. A current source (8,9) thus formed conveys a more or less constant current I1 under the supply of a voltage to the base of the transistor 8. The reference Vbe at the transistor 8 denotes a base-emitter threshold voltage, or in other words, a base-emitter voltage drop. At the current I1, a voltage drop denoted by V9 occurs across the resistor 9. The current source (8,9) and the emitter-coupled transistors (6,7) together constitute a differential amplifier (6–10), a signal input of which is denoted by 10 to which the signal PV1 is applied. In the differential amplifier (6–10), the current I1 is distributed over the transistors 6 and 7 dependent on the instantaneous value of the signal PV1, while the collector currents are denoted by I11 and I12.

In addition to the differential amplifier (6–10), the FIGURE shows a second differential amplifier (11–15) which is formed in the same manner with two emitter-coupled transistors 11 and 12, a current source transistor 13, an emitter-resistor 14 and a signal input 15. The current source (13, 14) carries a more or less constant current I2, while a voltage V14 is present across the resistor 14. The baseemitter threshold voltage is denoted by Vbe again and the exact voltage values at the transistors 8 and 13 may be different. At the transistors 11 and 12, the current I2 splits up into two collector currents I21 and I22, while a fraction of the signal PV denoted by PV2 at the connection of the resistors 4 and 5 is applied to the input 1115.

The first and second differential amplifiers (6–10) and (11–15) are described, by way of example, with different currents I1 and I2, with the ground potential as a bias voltage at the bases of the transistors 7 and 12 and with the supply of the different input signals PV1 and PV2. It is assumed that staring from a state with PV=PV1=PV2=0 V and I11=I12 and I21=I22, the differential amplifier (6–10) is the first to be driven into saturation, for example, at the voltage Vx in the input signal PV for which it holds that I11=I1 (the saturation current) and I12=0. Furthermore, it is assumed that the differential amplifier (11–15) is driven into saturation with I21=I2 (the saturation current) and I22=0 at a voltage which is equal to or greater than Vw in the input signal PV. For the further description of the differential amplifier (11–15), it is assumed that it is driven into saturation at the voltage Vw. The gamma correction circuit is then also active as a white level limiter circuit.

It is important for the operation of the gamma correction circuit that the differential amplifiers (6–10) and (11–15) can each be driven into saturation at a different input signal value. Instead of the operation described with the larger (PV1) and the smaller (PV2) input signal values, different bias voltages at the bases of the transistors 7 and 12 may be considered, or emitter-resistors of equal values may be provided at the transistors 6 and 7 and/or 11 and 12 having different values for each differential amplifier. Furthermore, current subtraction instead of addition can be used by interchanging the signal supply to the differential amplifiers.

For coupling out the currents I11, I12, I21 and I22, the collectors of the first transistors 6 and 11 and of the second transistors 7 and 12 of the transistor pairs (6,7) and (11, 12), respectively, are connected together and are connected as differential amplifier outputs to first and second connections 16 and 17, respectively, of a current-mirror circuit (16–21) having two transistors 18 and 19 and possibly two resistors 20 and 21. The connection 16 is connected to the collector and the base of the pnp-transistor 18 and the base of the pnp-transistor 19, whose collector is connected to the connection 17. The emitters of the transistors 18 and 19 are connected via the resistors 20 and 21, respectively, to a supply terminal carrying the voltage +Va. At the connections 16 and 17, the references IO denote the equal currents supplied by the current-mirror circuit (16–21). The current-mirror circuit (16–21) is then active as a common supply circuit for the differential amplifiers (6–10)

and (11-12) and as a current addition circuit with a simple and stable current addition.

The connection 17 is connected to the circuit output 2 of the gamma correction circuit and is also connected to a resistor 22, which has the ground potential as a bias voltage. Thus, the possibility of a single-ended coupling out of the signal is utilized in the current-mirror circuit (16-21). It has been denoted at that the resistor 22 is adjustable so that the amplitude of the output signal PV' can be arbitrarily adjusted. Furthermore, the current through the resistor 22 is denoted by I.

The bases of the curent source transistors 8 and 13 are connected to an output 23 of a voltage source (23-27) comprising a Zener diode 24 and three resistors 25, 26 and 27. The resistor 25 and the Zener diode 24 are disposed in a series arrangement between a terminal carrying the ground potential and a terminal carrying the supply voltage $-Va$. A resistor-voltage divider (26, 27) including a resistor 26 and an adjustable resistor 27 is arranged in parallel with the Zener diode 24. The junction point between the resistors 26 and 27 is connected to the output 23. The adjustable resistor 27 may be utilized to obtain a given voltage at the bases of the current source transistors 8 and 13 at a given value of the base-emitter threshold voltage Vbe and the value of the resistors 9 and 14, respectively, at which a temperature compensation occurs so that temperature changes in the gamma correction circuit do not unacceptably affect the gamma characteristic.

The operation of the gamma correction circuit will be described with reference to the input signal PV shown. If the ground potential of 0 V is present in the signal PV, the following relations between and for the current apply: $I11=I12=\frac{1}{2}I1$, $I21=I22=\frac{1}{2}I2$, $I0=\frac{1}{2}I1+\frac{1}{2}I2$, $I=0$. If the value Vx is present in the signal PV, the following relations apply: $I11=I1$, $I12=0$ $I0=I1+I21-=I22+I$ from which $I=I1+I2-2\ I22$ can be derived. If the value Vw is present in the signal PV, the following relations apply: $I11=I1$, $I12=0$, $I21=I2$, $I22=0$, $I0=I1+I2=I$.

It is found that when the input signal PV shown is applied, the current I increases from 0 to $I1+I2$, and since this increase is effected non-linearly, it leads to a voltage across the resistor 22 as shown at the signal PV'. The gamma of the characteristic is determined by the non-linear transfer characteristic at the differential amplifiers (6-10) and (11-15). In practice, the use, shown in the FIGURE, of two differential amplifiers is found to be satisfactory. Dependent on the requirements imposed on the accuracy of the gamma variation, the number of differential amplifiers may be extended.

The gamma obtained at the output signal PV' is the result of the addition of a number of output currents of differential amplifiers. The non-linear transfer characteristic between the output current and the input voltage of the differential amplifier has a variation which is dependent on the product of the current of the current source and a tangent hyperbolic function of the input voltage divided by the thermal voltage which is equal to $kT/9'$ with k=Bolzmann constant, T=number of degrees Kelvin and q=charge of an electron. As a result of the transfer characteristic, the differential amplifier has a negative temperature coefficient, while its value is dependent on the input signal value at the differential amplifier. For a given signal value range, there is thus a given negative relative temperature coefficient. without any further measures, the gamma would also change at a changing temperature in the gamma correction circuit. In order to be able to use the gamma correction circuit at changing temperatures, a temperature compensation is required. For this purpose, the FIGURE provides a solution by using the adjustable voltage source (23-27). By adjusting the voltage source (23-27), a given voltage is obtained at the output thereof, which, in accordance with the FIGURE, is equal to the sum of the base-emitter threshold voltage Vbe and the voltage drops V9 and V14 across the emitter-resistors 9 and 14, respectively. The current sources (8,9) and (13, 14) then convey the current 11 and 12, respectively. A temperature change results in the base-emitter voltage Vbe changing, so that the emitter voltage changes in the reverse direction at the fixed base voltage by a factor which is more or less equal to 2 mV per degree Kelvin. This negative temperature coefficient at the voltage Vbe corresponds to a positive relative temperature coefficient at the current (I1, I2) of the relevant current source. By rendering the absolute value of the positive temperature coefficient at the current of the current source equal to that of the negative relative temperature coefficient at the differential amplifier transfer characteristic for a given input signal value to be chosen, a temperature compensation which is as satisfactory as possible at this value is obtained. In this case, there is a choice at which input signal value the temperature independence is adjusted. In practice, it is found that the gamma characteristic can be rendered temperature-independent as satisfactorily as possible when choosing the maximum signal value Vw. At the minimum value Vb=0 V with the output current I=0 (which implies a temperature independence) the temperature influence is also eliminated at the maximum value Vw by this choice, which goes together with an optimum compensation for intermediate signal values.

The following is mentioned as an example to illustrate the temperature compensation: it can be calculated that for the differential amplifiers (6-10) and (11-15) the negative relative temperature coefficient at the maximum signal value is inversely proportional to the temperature in degrees Kelvin. At a room temperature of approximately 300° K., negative relative temperature coefficient which is equal to 1/300=0.333% per K follows per degree of temperature increase. The temperature coefficient of $-2$ mV per K at the voltage Vbe results for the current of the current sources (8, 9) and (13, 14) in a positive relative temperature coefficient of 0.2% per K if a voltage V9 or V14 of 1 V is present across the emitter-resistors 9 and 14 of the current source transistors 8 and 13, respectively. When a voltage of 1.5 V is present, the positive relative temperature coefficient for the current of the current source would be 0.3% per K. To obtain the temperature coefficient of 0.333% per K, a voltage V9, V14 of 1.66 V is required. For a rounded-off voltage Vbe=0.7 V it follows that the voltage at the output 23 should have to be adjusted at 2.36 V. A temperature compensation is automatically obtained thereby.

For the sake of completeness, it is stated that the bases of the transistors 8 and 13, in contrast to what is conventional, do not have a diode-resistor connection with the supply terminal carrying the voltage $-Va$. Normally this connection serves for the temperature compensation at the current source transistors 8 and 13. In contrast thereto, the temperature-dependence of the current source transistors 8 and 13 is utilized to obtain the temperature compensation at the differential amplifiers (6-10) and (11-15).

It is to be noted that the embodiment of the adjustable voltage source (23–27) shown in the FIGURE is satisfactorily usable in practice. Instead of the embodiment shown, embodiments with adjustable amplifiers are feasible. Furthermore there is a possibility of using a control circuit for a continuous, automatic adaptation of the voltage at the output 23 by adding a pulse to the input signal PV in television line blanking periods, this pulse having, for example, an amplitude of Vw volt at which the amplitude, changing inter alia because of temperature changes, of the corresponding pulse in the output signal PV' is maintained at the more or less constant value of Vw volt by using a reference comparison circuit in the control circuit. Instead of the control circuit, the embodiment shown in the FIGURE has a simpler construction.

We claim:

1. A gamma correction circuit having a circuit input for a signal to be gamma corrected and a circuit output for supplying the gamma corrected signal, comprising:
   (a) a plurality of non-linear differential amplifiers each comprising a differential amplifier input coupled to said circuit input and a differential amplifier output, a first transistor having a first base coupled to said differential amplifier input, a first emitter, and a first collector, and a second transistor having a second base coupled to a bias voltage, a second emitter coupled to said first emitter, and a second collector, said differential amplifiers each having a negative relative temperature coefficient in its transfer characteristic which is dependent on its respective input signal value, and said temperature coefficient of each of said differential amplifiers being compensated for by the respective current source coupled thereto, each of which has a positive relative temperature coefficient in its current equal to that of said negative temperature coefficient of each of said respective differential amplifiers;
   (b) a plurality of current sources each coupled to respective coupled emitters of each of said differential amplifiers; and
   (c) a current-mirror circuit coupled to said differential amplifier outputs and said circuit output;
   characterized in that said circuit input is coupled to a voltage divider which is coupled to said differential amplifier inputs of said non-linear differential amplifiers, each of which can be driven into saturation at different input signal values, and in that said current sources each have a different substantially constant current, and in that said current-mirror circuit has first and second connections, said first connection coupled to said first collectors and said second connection coupled to said second collectors.

2. A gamma correction circuit as claimed in claim 1, wherein each of said current sources comprises a transistor having a base, an emitter and a collector, an emitter-resistor connected between said emitter and a terminal of a voltage source, said base being connected to an output of said voltage source and said collector connected to said respective coupled emitters.

3. A gamma correction circuit as claimed in claim 2, wherein said voltage source comprises a series arrangement of a Zener diode and a resistor present between said voltage terminal and a bias voltage, and a resistor-voltage divider including an adjustable resistor arranged parallel to the Zener diode, the output of the voltage source being connected to a junction point in the voltage divider.

4. A gamma correction circuit as claimed in claim 1, wherein:
   one of said connections of said current-mirror circuit is coupled to said output of the gamma correction circuit and to a resistor which is coupled to a bias voltage.

5. A gamma correction circuit as claimed in claim 4, characterized in that said resistor is adjustable.

* * * * *